United States Patent [19]

Kuban

[11] Patent Number: 4,896,455
[45] Date of Patent: Jan. 30, 1990

[54] PLANT STARTER APPARATUS

[76] Inventor: Eugene J. Kuban, R.D. #1, Box 588, Eight Four, Pa. 15330

[21] Appl. No.: 255,376

[22] Filed: Oct. 11, 1988

[51] Int. Cl.⁴ ............................................... A01G 9/02
[52] U.S. Cl. ..................................... 47/66; 47/DIG. 6
[58] Field of Search .......... 47/17, 66, 69, 79, DIG. 6, 47/72; 206/423

[56] References Cited

U.S. PATENT DOCUMENTS

| | | | |
|---|---|---|---|
| 500,476 | 6/1893 | Douthit | 111/99 |
| 1,520,647 | 12/1924 | Hennegan | 47/72 X |
| 2,110,981 | 3/1938 | Auslander | 47/72 |
| 2,673,420 | 3/1954 | Griffeth | 47/26 |
| 2,777,253 | 1/1957 | Bensin | 47/DIG. 6 X |
| 2,940,219 | 6/1960 | Schiller | 47/32 |
| 3,066,445 | 12/1962 | D'Amic | 47/DIG. 6 X |
| 3,395,486 | 8/1968 | Campbell | 47/66 |
| 4,359,838 | 11/1982 | Dooley | 47/1 R |
| 4,733,521 | 3/1988 | Weder | 47/72 X |
| 4,795,601 | 1/1989 | Cheng | 47/72 X |

FOREIGN PATENT DOCUMENTS

| | | | |
|---|---|---|---|
| 190721 | 7/1957 | Austria | 47/72 |
| 2036163 | 12/1970 | France | 47/67 |

Primary Examiner—Henry E. Raduazo
Assistant Examiner—Jerrold D. Johnson
Attorney, Agent, or Firm—Clifford A. Poff

[57] ABSTRACT

A plant starter apparatus for allowing a plant seedling to receive light from a multiplicity of directions. A parabolic reflector is positioned such that light striking the parabolic reflector is reflected towards a focal point. A plant container containing both soil and plant seed is positioned such that, upon germination, the plant seedling receives both incident light and the light reflected from the parabolic reflector. As the plant seedling grows, the seedling receives ever-increasing amounts of light reflected from the parabolic reflector. Because the plant seedling receives light from the multiplicity of directions, growth of the plant seedling is maximized as the plant grows vertically.

14 Claims, 3 Drawing Sheets

PLANT STARTER APPARATUS

BACKGROUND OF THE INVENTION

1. Field of the Invention:

The present invention relates generally to containers for holding plants, and, more particularly, to a plant starter apparatus which provides a plant seedling with light from a multiplicity of directions to ensure vertical growth of the plant.

2. Description of the Prior Art:

When starting a plant from seed, adequate amounts of water and nutrients are required in order for the seed to germinate. Once the plant seed germinates, the seedling additionally requires sunlight, or a suitable source of artificial light, in order to continue growing.

Various devices and apparatus have been developed in order to more advantageously grow and cultivate plants. These devices and apparatus vary from elaborate, expensive structures utilized for commercial agricultural applications to quite simple devices, such as those utilized by hobbyists.

For example a hobbyist may merely place a container holding soil and a plant seed near a window and periodically provide water to the plant seed. However, when positioned proximate to a window, upon germination, the plant seedling receives sunlight from only that side which faces the window, causing angular growth of the seedling as the plant grows towards the sunlight. In order to minimize this effect, the container holding the plant and the plant must be periodically rotated. Even when the plant and container are rotated as frequently as one or more times per day, the seedling still grows crookedly, thereby preventing optimum growth of the plant.

An artificial light source may be used to minimize the non-vertical growth. Over time, this becomes an expensive means to minimize this non-vertical growth.

Many greenhouse-type constructions are known in the art to aid in the cultivation and growth of plants. Greenhouse-type constructions are advantageous in that a plant positioned in the greenhouse receives, throughout each day, sunlight from many directions.

One such example of a greenhouse-type structure utilized to cultivate plant cultures is disclosed in U.S. Pat. No. 4,095,369 to Posnansky et al. Disclosed therein is a greenhouse-type construction which includes a covering device comprised of a large number of pivotable parabolic reflectors to prevent overheating of the interior of the construction. The parabolic reflectors block sunlight from reaching plants positioned within the greenhouse construction, and transfer heat generated by the sunlight which strikes the parabolic reflectors to a heat carrier which carries away the heat.

Other enclosure structures have been developed which utilize parabolic reflectors, although the structures are not utilized for the cultivation of plants. Disclosed in U.S. Pat. No. 3,182,654 to Culling is a solar heating apparatus which concentrates solar energy on a very small area, and is utilized to melt or heat an object. The apparatus includes a housing having a portion thereof which is parabolical to direct light towards the object. Similarly, U.S. Pat. No. 4,233,958 to Heden discloses a building construction which traps heat generated by sunlight. Sunlight is caused to be reflected onto a heat accumulator which stores heat when the sun is shining, and which allows that heat to be utilized at later periods of time when sunlight is not available.

The cost of virtually all greenhouse-type constructions preclude their use by most hobbyists.

It is accordingly the object of the present invention to provide an inexpensive device to provide a plant seedling with light from a multiplicity of directions to allow the seedling to achieve vertical and healthy growth.

SUMMARY OF THE INVENTION

In accordance with the present invention, a plant starter apparatus for starting a plant from seed wherein the plant, upon germination, receives light from a multiplicity of directions to allow vertical growth of the plant is disclosed. The plant starter apparatus includes a soil holding means for holding a desired amount of soil, a reflector means positioned to reflect all incident light striking the parabolic reflector means towards the top surface of the soil held in the soil holding means, and, in the preferred embodiment, a positioning means for positioning a plant seed at a center of the soil holding means pot to allow the plant seedling, upon germination to receive light from the multiplicity of directions. The reflector means may, for example, be comprised of a parabolic reflector for reflecting light towards a focus point located upon the top surface of the soil.

The soil holding means is preferably comprised of a plant container forming an inverted truncated conic having an open top end, and may further form a lip at the open top end thereof.

In a further embodiment of the present invention, a water-supply means is provided for supplying to the soil holding means a continuous supply of water. The water-supply means may also be comprised of a water container forming an inverted truncated conic having an open top end, wherein the water container is of dimensions to allow positioning therewithin of the plant container. The lip portion formed at the open top end of the plant container may rest against the open top end of the water supply container to allow supportive engagement thereby. The water container may also form a lip at the open top end thereof to allow the lip of the plant container to abut thereagainst. Preferably, the plant container is supported to extend into the water container in such a manner that a separation distance is maintained between a bottom end of a plant container, and a bottom end of a water container to form a water chamber thereby. Apertures extending through the bottom end of the plant container allow water positioned in the bottom end of the water container to be supplied to the soil holding the plant seedling.

In the preferred embodiment, the reflector means is coupled to, and extends upwardly from the water container, and a counterweight counterbalances the weight of the reflector means.

BRIEF DESCRIPTION OF THE DRAWINGS

The present invention will be better understood when read in light of the accompanying drawings in which.

DESCRIPTION OF THE PREFERRED EMBODIMENTS

Figure 1:
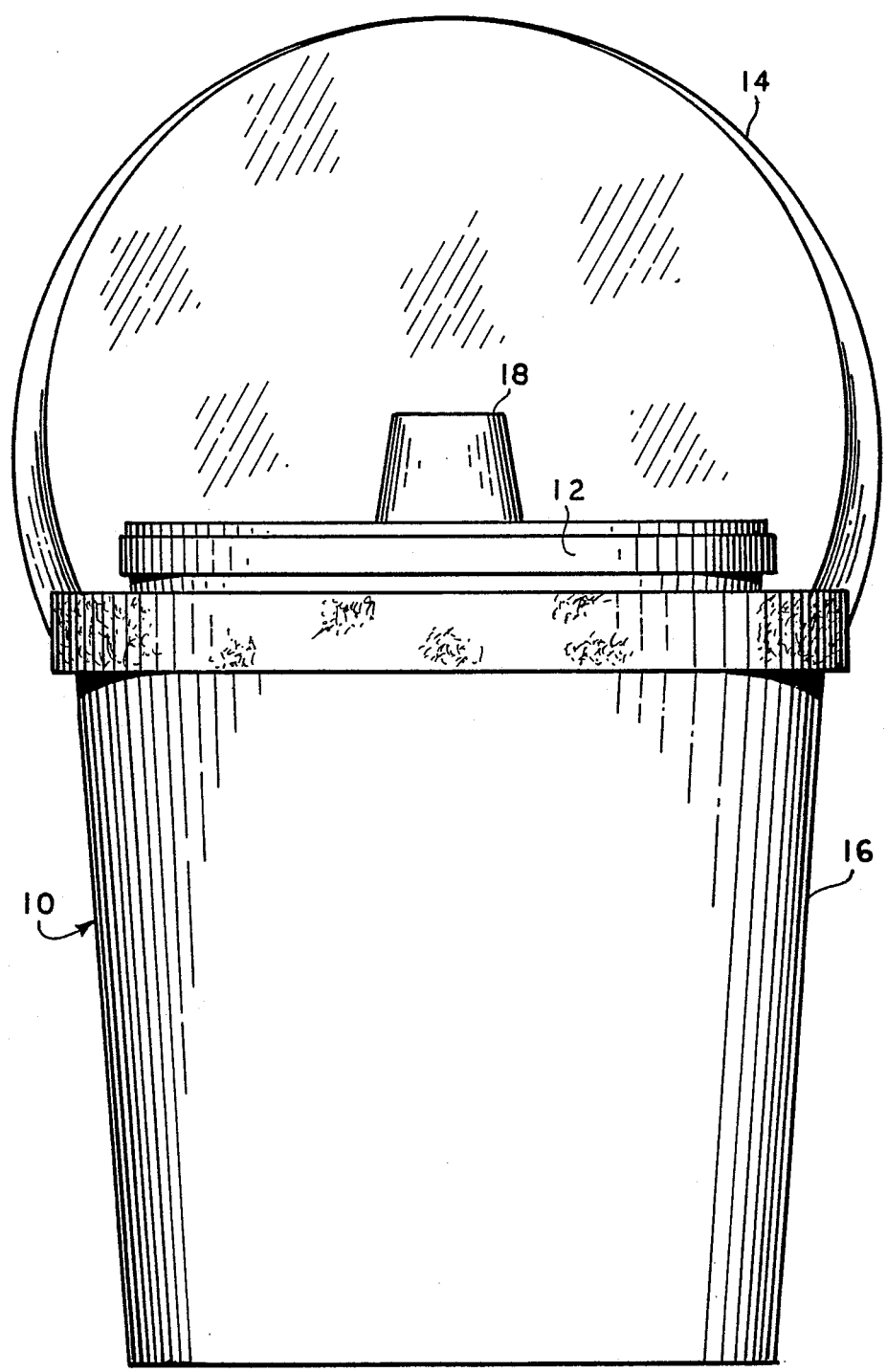
FIG. 1 is a perspective view of the plant starter apparatus of the present invention.
Figure 2:
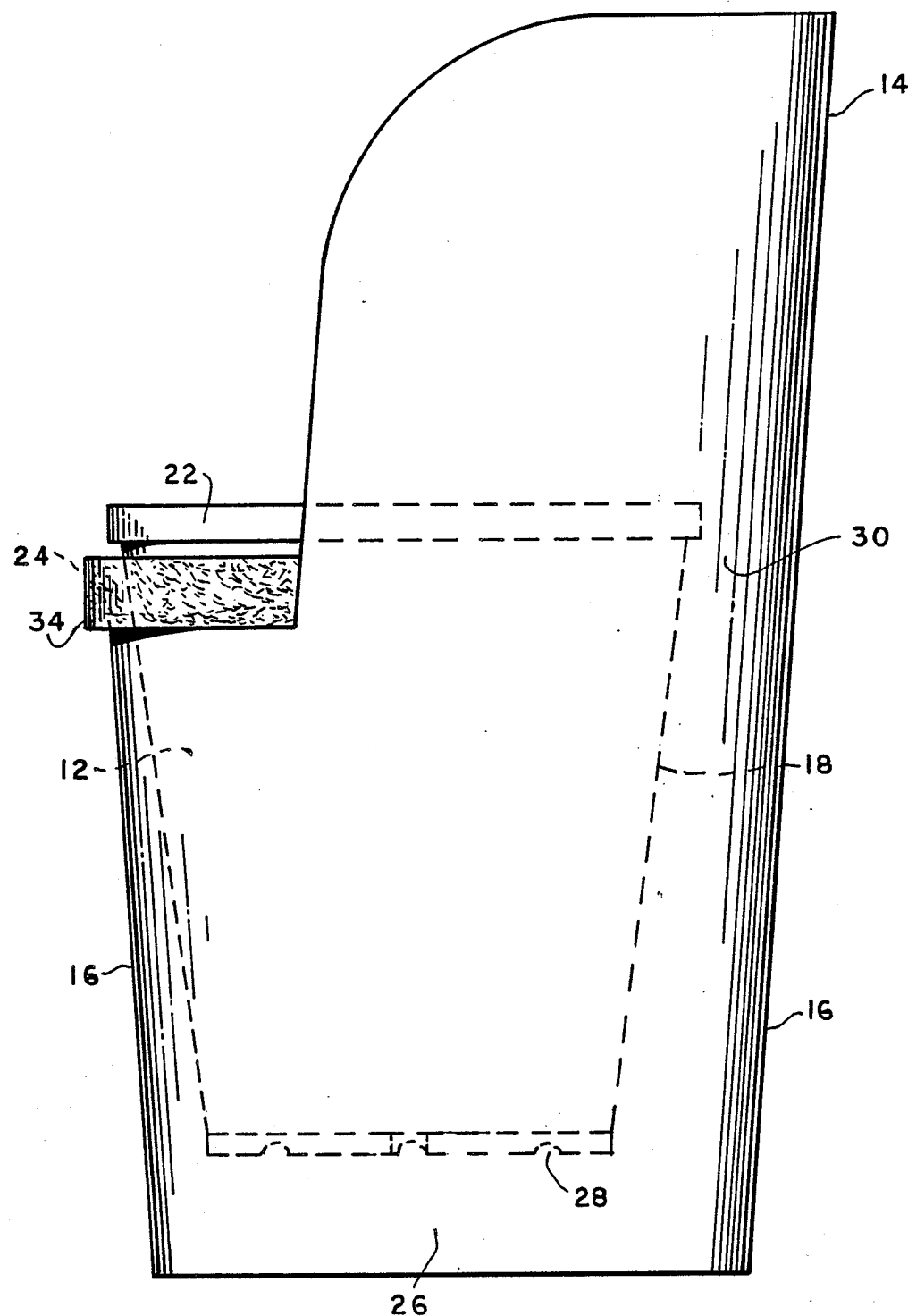
FIG. 2 is a side, elevational view of the plant starter apparatus of the present invention.

Referring first now to the schematic illustration of FIG. 1, there is shown the plant starter apparatus, referred to generally by reference numeral 10, of the present invention. Plant starter apparatus 10 is comprised of inner pot 12, reflector 14, outer pot 16, and, in the preferred embodiment, plant seed positioner 18. In the preferred embodiment, and as shown in the side elevational view of FIG. 2, pots 12 and 16 are formed of inverted truncated conics wherein the relative dimensions of pots 12 and 16 are such as to allow inner pot 12 to extend within outer pot 16. Lip 22 is formed about the circumference of the open top end of inner pot 12, and similarly, lip 24 is formed about the circumference of the open top end of outer pot 16. Pots 12 and 16 may, of course, alternatively be formed of any of many other geometric shapes. As best illustrated in FIG. 2, when inner pot 12 is positioned to extend within outer pot 16, a bottom edge portion of lip 22 engages with a top edge portion of lip 24. Inner pot 12 is supported thereby, and chamber 26 is formed by the separation maintained between the bottom ends of the respective pots 12 and 16. Further formed to extend through the bottom end and sidewalls of inner pot 12 are a series of apertures 28.

In the preferred embodiment, and as best illustrated in the side view of FIG. 2, lip 24 of outer pot 16 forms opening 30 about a portion thereof. Opening 30 provides a path to allow water to be periodically supplied to water chamber 26.

Figure 3:
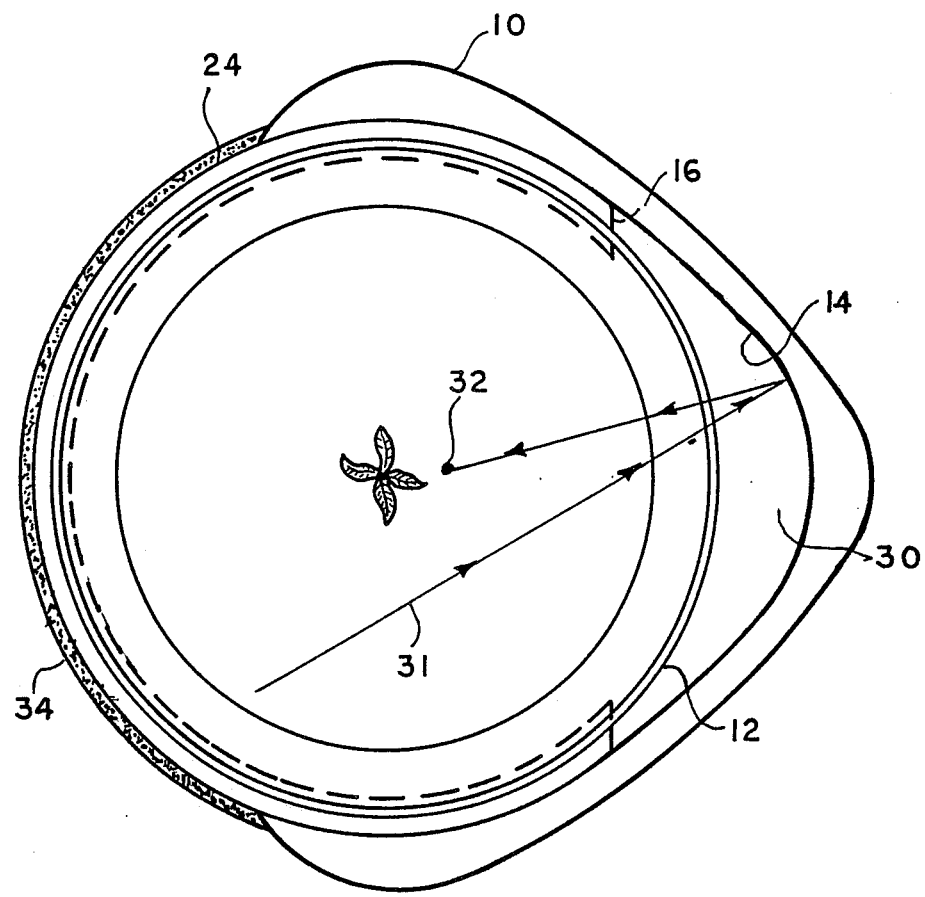
FIG. 3 is an overhead view of the plant starter apparatus of the present invention illustrating the functioning of a parabolic reflector utilized to direct light towards a plant seedling to most advantageously allow vertical growth thereof.

Attached to outer pot 16 and extending upwardly therefrom is reflector 14. In the preferred embodiment, and as illustrated, reflector 14 is a parabolic reflector. However, other reflector, capable of reflecting incident sunlight means, such as a circular reflector or a reflector containing an acute angle may similarly be utilized. As shown in the overhead view of FIG. 3, incident light, taking the path indicated in the Figure by line 31, striking parabolic reflector 14 is reflected to converge upon focus point 32. To prevent the plant starting apparatus 10 from becoming unbalanced, lip portion 24 has positioned thereupon a semi-circular counterweight 34 to offset the weight of parabolic reflector means 14.

Figure 4:
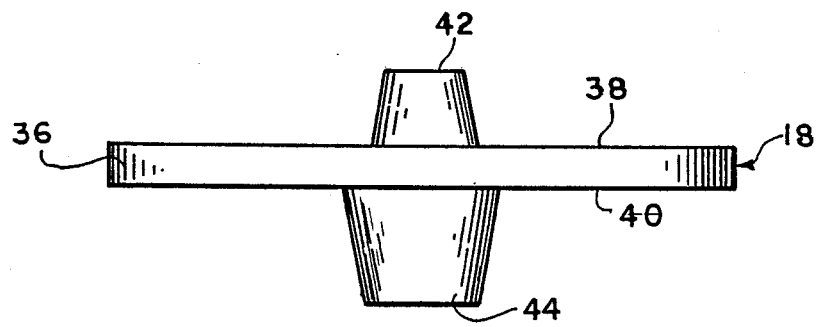
FIG. 4 is a perspective illustration of the plant positioner of the preferred embodiment of the present invention.

Referring now to FIG. 4, there is illustrated the seed positioner 18 which is further included in the preferred embodiment of the present invention. Seed positioner 18 is comprised of disk member 36 having upper surface 38 and lower surface 40. Disk member 36 is of a diameter allowing positioning thereof in inner pot 12. Mounted upon upper surface 38 at the center thereof, is truncated conical seed locater 42, and mounted upon lower surface 40, at the center thereof, is truncated conical seed locater 44. The diameter of seed locater 42 varies from that of seed locater 44.

When it is desired to plant a seed, after placing a desired amount of soil in inner pot 12, seed positioner 18 is positioned such that a bottom surface of seed locater 44 abuts with the surface of the soil. A downward force exerted upon the disk member 36 causes seed locater 44 to make an indentation into the surface of the soil. Further exertion of force causes the soil to be compressed, first by seed locater 44, and then by disk member 36. The seed positioner 18 is then removed, a plant seed is positioned in the indentation, and the seed is covered by soil. As the plant seed germinates, the plant seedling grows upwardly through non-compacted soil which covers the seed. In this manner, the seedling is caused to be positioned at the center of inner pot 12. Alternatively, and depending upon the size of the seed to be planted, seed locater 42 may be similarly utilized in order to form the indentation in which the plant seed is positioned.

The plant starter apparatus 10 of the present invention is advantageous in that a plant seedling, when properly positioned in inner pot 12 receives light from many directions simultaneously, thereby allowing the plant seedling to grow vertically. Further, because the apparatus 10 provides the plant seedling with this multi-directional light without the need for artificial lighting, plants may be started in the plant starter 10 at virtually no cost. By simply placing a desired amount of soil in inner pot 12, positioning a plant seed at the center portion of the top surface of the soil through use of plant positioner 18, supporting the inner pot 12 to extend within outer pot 16, by placing the entire plant starter apparatus 10 at a location where apparatus 10 receives sunlight, and by providing an adequate amounts of water to water chamber 26, the plant seed is allowed to germinate, and to then receive light, e.g., sunlight, from the multiplicity of directions. A periodic resupply of water is the only requirement to ensure proper growth of the plant seedling. As the plant seedling grows, the light reflected from reflector 14 towards focal point 32 strikes the plant seedling, encouraging additional vertical growth of the seedling.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. Plant starter apparatus for starting a plant from seed wherein the plant, upon germination, receives light from a multiplicity of directions to allow vertical growth of the plant, said apparatus including:
   soil holding means for holding a desired amount of soil, the soil held by the soil holding means forming a surface suitable for planting; and
   reflector means having a reflective surface capable of focusing reflected incident sunlight extending about a peripheral segment of said soil holding means, and above the soil holding means to a height which is sufficient for continuous reflecting of incident light proximate to foliage of a plant during upward growth thereof after emerging from the surface of the soil held in the soil holding means.

2. The plant starter apparatus of claim 1 wherein said reflector means includes a parabolic reflector.

3. The plant starter apparatus of claim 1 wherein said soil holding means includes a plant container forming an inverted truncated conic having an open top end.

4. The plant starter apparatus of claim 3 wherein said plant container forms a lip at the open top end thereof.

5. The plant starter apparatus of claim 4 further including a water-supply means for providing a continuous supply of water to the plant.

6. The plant starter apparatus of claim 5 wherein said water supply means includes a water container forming an inverted truncated conic having an open top end.

7. The plant starter apparatus of claim 6 wherein said water container is of dimensions allowing placement therewithin of the plant container.

8. The plant starter apparatus of claim 7 wherein said water container forms a lip at an open top end thereof to allow the lip of the plant container to engage with the lip of the water container to be supported thereby, while allowing said plant container to extend into the water container.

9. The plant starter apparatus of claim 8 wherein said plant container is of a length less than the length of the water container allowing a bottom portion of the water container to form a water chamber.

10. The plant starter apparatus of claim 9 wherein said reflector means is coupled to, and extends upwardly from the water container.

11. The plant starter apparatus of claim 10 further including a counterweight mounted upon the water container to counterbalance the weight of the reflector means.

12. The plant starter apparatus of claim 1 further including a plant seed positioning means for allowing the plant seed to be positioned at a center point of the top surface of the soil held in the soil holding means.

13. The plant starter apparatus of claim 12 wherein said plant seed positioning means includes a disk member having an upper surface and a lower surface and a first truncated conic section, wherein the first truncated conic section is mounted upon the lower surface of the disk member at a center point thereof, disk member being of dimensions to allow placement thereof within the soil holding means such that the first truncated conic contacts with the top surface of the soil, and such that force exerted upon the disk member causes the first truncated conic section to make an indentation into the soil to allow a plant seed to be positioned in said indentation.

14. The plant starter apparatus of claim 13 further including a second truncated conic section mounted upon the upper surface of the disk member.

* * * * *